(No Model.)
F. H. BROWN.
PRIMARY BATTERY CELL.
No. 598,556. Patented Feb. 8, 1898.
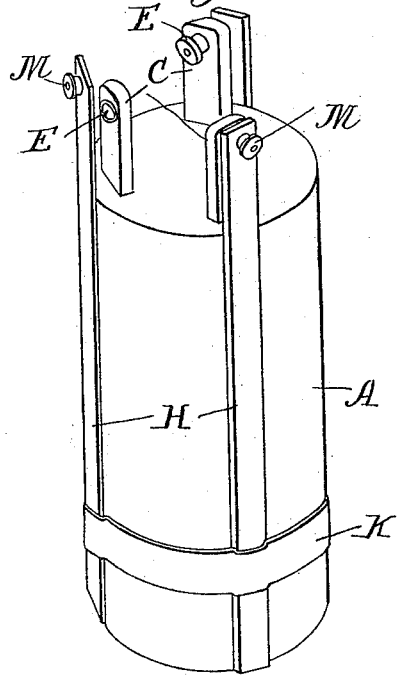
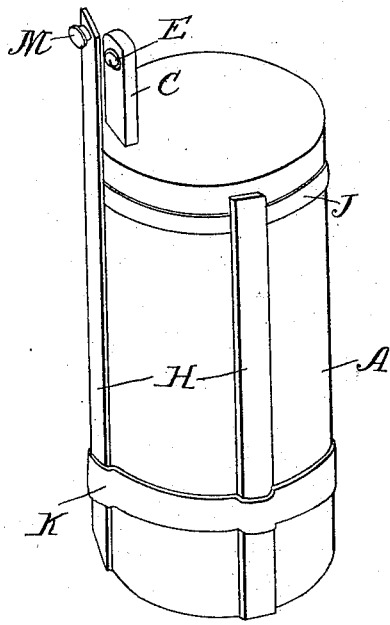
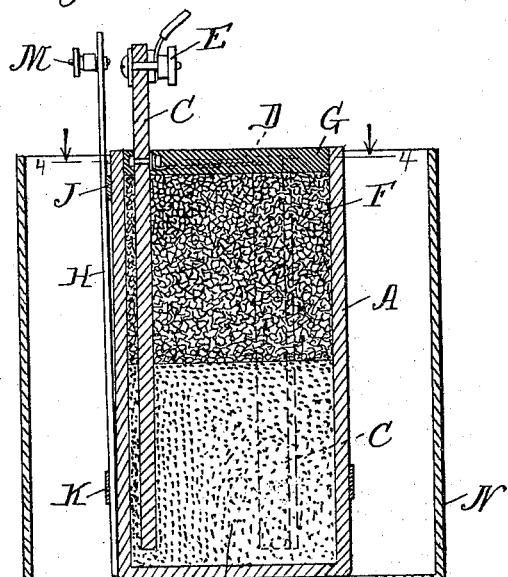
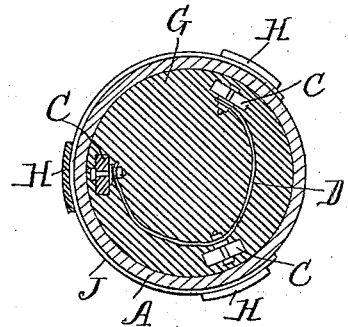
Witnesses:
Wm. M. Rheem
Wm. F. Hamming
Inventor
Fred H. Brown
by Brown & Darby
Atty's
THE NORRIS PETERS CO., PHOTO-LITHO., WASHINGTON, D. C.

UNITED STATES PATENT OFFICE.

FRED H. BROWN, OF CHICAGO, ILLINOIS.

PRIMARY-BATTERY CELL.

SPECIFICATION forming part of Letters Patent No. 598,556, dated February 8, 1898.

Application filed December 9, 1895. Renewed January 12, 1898. Serial No. 666,477. (No model.)

*To all whom it may concern:*

Be it known that I, FRED H. BROWN, a citizen of the United States, residing at Chicago, in the county of Cook and State of Illinois, have invented a new and useful Improvement in Primary-Battery Cells, of which the following is a specification.

This invention relates to primary-battery cells.

The object of the invention is to improve the construction of primary-battery cells and the method of arrangement of the parts thereof and to render the same more powerful and efficient.

The invention consists, substantially, in the construction, mode of arrangement, combination, and relative arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a view illustrating a complete assemblage and form of arrangement of the several parts of a battery-cell embodying the principles of my invention. Fig. 2 is a view illustrating the preferred form of my invention for practical commercial use. Fig. 3 is a vertical central sectional view of a battery and cell embodying my invention. Fig. 4 is a transverse sectional view taken on the line 4 4, Fig. 3, looking in the direction of the arrows.

The same reference-sign is employed to designate the same part wherever it occurs throughout the several views.

In carrying out my invention I provide a single negative element of the battery, and I arrange in suitable and proper electrical relation therewith a positive element consisting of a number of connected strips, the arrangement being such that, if desired, a plurality of currents may be obtained from the cell or a single current may be obtained having an amperage equivalent to the combined amperage of the independent currents. In order to secure this result, I provide a series or plurality of carbon conductors C and electrically connect the same with each other, as shown at D in Figs. 3 and 4. Each of these carbon conductors may be provided with binding-posts E for the leading-wires of the working circuits, as shown in Fig. 1, or, if desired, and preferably for commercial purposes, only one of the carbons may be provided with a binding-post, as shown in Figs. 2, 3, and 4. The carbons C are then arranged in suitable relation with respect to the negative element to form a conductor therefrom. In the particular form shown, to which, however, I do not desire to be limited or restricted, but which I deem preferable for commercial purposes, I provide a porous cup A, in which I arrange the carbons C, preferably at equal distances from each other. I then about half fill the cup A with a mixture of black oxid of manganese and plumbago in about the proportion of two parts, by weight, of the manganese to one part of plumbago, first reducing the mixture to a thin paste by the addition of about a half-saturated aqueous solution of sal-ammoniac, as indicated at B, Fig. 3. I then fill the remaining portion of the porous cup to within a short distance of its top with carbon which has been crushed or pounded to preferably about the size of large shot. I finally fill up the remaining portion of the porous cup with a suitable insulating material G, which serves to form a seal for the cup. In practice I find that plaster-of-paris efficiently answers this purpose. In the arrangement of the carbons C in cup A, I place the electrical connection D in such manner as to be embedded in the insulating material G, said connection thereby being insulated from the agglomerate mass composing the negative element of the battery-cell. This arrangement is essential and important in order to secure the beneficial results which are obtained from my invention, as will be more fully hereinafter explained.

The other element or elements of my improved battery-cell comprises a plurality of zinc bars or strips H, corresponding in number and arrangement to the number and arrangement of the carbons C and similarly connected electrically to each other, as by means of a strip J. The zincs H are preferably arranged in the outside of the porous cup and may be secured to the cup in any suitable manner, as by means of a rubber band K. As shown in Fig. 1, each of the zinc strips H may be extended above the top of the cup and provided with a suitable binding-post M for the leading-wire of the working circuits, or and preferably for commercial purposes only one of the zincs may be extended above the top of the cup to coöperate with the single carbon, as shown in Figs. 2 and 3.

It will be understood that in the case where only one carbon is extended above the top of the cup the remaining carbons are completely embedded in the contents of the cup, as indicated in Figs. 3 and 4.

The provision of the insulating-seal G for the cup effects an exclusion of the air and the embedding of the electrical connection D in the insulation G prevents undue corrosion.

When a cell constructed as above described is arranged in a suitable jar or vessel N which contains a suitable solution—as, for instance, a solution of water and sal-ammoniac—a current of electricity is generated between the strips of zinc and the correspondingly-arranged carbons in the cup. The nearer the strips of zinc are arranged with reference to the corresponding and coacting carbons the better the results. It will of course be understood that it is important and essential that the strip J, connecting the zincs, be so arranged as not to be immersed or in contact with the fluid or solution in the jar N.

I have found that polarization is prevented by employing the black oxid of manganese as a constituent part of the agglomerate mass composing the negative element of the cell by reason of the fact that this material gives off when attacked a large volume of oxygen, which prevents polarization.

I have found that by mixing the black oxid of manganese with finely-divided plumbago in about the proportions specified the conductivity of the mass is greatly increased, and hence by thus lessening the internal resistance of the cell the electromotive force of the current is greatly increased.

It will be observed that in the form shown in Fig. 1 where the carbons are not in electrical connection with each other and where the zincs are not connected to each other I provide in effect as many batteries as there are pairs of positive strips and carbon conductors, and that too by the use of a single negative element. In this form it will be seen that the potential or quantity of current can be readily varied by varying the method of connecting up the various pairs, and when any particular pair is not included in a working circuit I have found that no electrolytic action takes place in that portion of the negative element where that pair is located.

I have found in practice that a separate and independent current is obtained from each pair of zinc and carbon strips when arranged as above described, each having the same electromotive force and amperage, and that when only one pair of the strips is employed—as, for instance, when only one circuit is used, as in Figs. 2, 3, and 4—a current is obtained having the same voltage, but with an amperage equivalent to the combined amperage of the several independent pairs of strips.

I have found that when chlorid of silver is added to the mixture of black oxid of manganese and plumbago adjacent to the carbon sticks the efficiency of the cell is increased, but for ordinary commercial use the chlorid of silver may be omitted.

I have found by experiment that if the strip J and the connection D are immersed in the solution in the jar N and the agglomerate in the porous cup, respectively, I do not obtain the beneficial results above explained; but when the strip and connection are arranged as explained I produce a battery-cell that is more efficient and lasting than any form of sal-ammonic battery with which I am acquainted.

Having now stated the object and nature of my invention and having described an embodiment thereof and explained the construction, arrangement, function, and mode of operation, I desire it to be distinctly understood that I do not limit or restrict myself to the exact details shown and described, as many variations and alterations would readily suggest themselves to persons skilled in the art and still fall within the spirit and scope of my invention; but

What I claim as new and of my own invention, and desire to secure by Letters Patent of the United States, is—

1. In a battery-cell, a negative element, composed of an agglomerate of black oxid of manganese and plumbago and having a superimposed layer of carbon, and sealed with an insulating material, and having a conductor embedded therein, in combination with a positive element; as and for the purpose set forth.

2. In a battery-cell, a negative element, composed of an agglomerate of black oxid of manganese and plumbago and having a superimposed layer of carbon and sealed with an insulating material, and having a plurality of carbon conductors embedded therein, and forming part thereof in combination with a positive element consisting of a number of connected strips, arranged respectively adjacent to said carbon conductors; as and for the purpose set forth.

3. In a battery-cell, a negative element, composed of an agglomerate of black oxid of manganese and plumbago, having a superimposed layer of crushed carbon and sealed with a layer of insulating material and having a plurality of carbon conductors embedded therein and forming part thereof arranged in electrical connection with each other, in combination with a positive element consisting of a number of connected strips corresponding in number and arrangement to the carbon conductors; as and for the purpose set forth.

4. In a battery-cell, a negative element, composed of an agglomerate of black oxid of manganese and plumbago, having a superimposed layer of carbon, and sealed with a layer of insulating material, and having a plurality of carbon conductors in electrical connection with each other, said electrical connection being embedded in said insulating material, in combination with a positive element consisting of a number of connected strips corresponding in number and arrangement with said conductors; as and for the purpose set forth.

5. In a battery-cell, a negative element, composed of an agglomerate of black oxid of manganese and plumbago, having a superimposed layer of carbon and a sealing-cap of insulating material, and a conductor arranged therein, and chlorid of silver introduced in said agglomerate adjacent to said conductor, and a positive element arranged adjacent to said conductor; as and for the purpose set forth.

In witness whereof I have hereunto set my hand this 6th day of November, 1895.

FRED H. BROWN.

Witnesses:
M. I. CAVANAGH,
S. E. DARBY.